United States Patent [19]

Guillaume et al.

[11] 4,054,545
[45] Oct. 18, 1977

[54] PROCESS FOR THE PREPARATION OF FLEXIBLE POLYURETHANE FOAMS

[75] Inventors: André Guillaume; Guy Poy, both of Lyon, France

[73] Assignee: Rhone-Poulenc Industries, Paris, France

[21] Appl. No.: 623,406

[22] Filed: Oct. 17, 1975

[30] Foreign Application Priority Data

Oct. 21, 1974 France .................................. 74.35312

[51] Int. Cl.² ...................... C08G 18/14; C08G 18/48; C07F 7/18
[52] U.S. Cl. ...................... 260/2.5 AH; 260/2.5 BG; 260/448.8 R
[58] Field of Search ........... 260/2.5 M, 2.5 H, 46.5 Y, 260/448.2 D, 2.5 AH, 448.8 R, 2.5 BG

[56] References Cited

U.S. PATENT DOCUMENTS

| | | | |
|---|---|---|---|
| 3,657,305 | 4/1972 | Morehouse | 260/2.5 AM |
| 3,717,665 | 2/1973 | Stuart | 260/448.2 D |
| 3,723,491 | 3/1973 | Rossmy | 260/46.5 Y |
| 3,994,948 | 11/1976 | Jayne et al. | 260/448.8 R |

Primary Examiner—H.S. Cockeram
Attorney, Agent, or Firm—Stevens, Davis, Miller & Mosher

[57] ABSTRACT

A process for the manufacture of so-called "cold" flexible polyurethane foams is described, which consists of pouring foaming compositions (obtained by mixing, in the main, very active polyether-polyols having an average of at least two hydroxyl groups per molecule, polyisocyanates, water, catalysts and crosslinking agents) into moulds, awaiting the formation of the foams and releasing these from the mould, the characteristic feature being that the composition contains 0.05% to 3% by weight, relative to the polyether-polyols, of a triorganosilylated polyol of the general formula $(A)_aC(CH_2OSiR_3)_{4-a}$, in which the symbols R, which may be identical or different, represent methyl, ethyl or vinyl radicals with the proviso that at least one radical R per $SiR_3$ group is a methyl radical, the symbol A represents a methyl or ethyl radical and the symbol a represents 0 or 1. This process makes it possible to stabilize the foams and give them a regular cellular structure.

6 Claims, No Drawings

PROCESS FOR THE PREPARATION OF FLEXIBLE POLYURETHANE FOAMS

The present invention relates to a process for the preparation of so-called "cold" flexible polyurethane foams.

It is known that the so-called "cold" flexible polyurethane foams do not require stoving subsequent to release from the mould in order to bring about their cross-linking. It is also known that in order to prepare these foams it is necessary to start from a particular type of polyether-polyol, a polyisocyanate, water and/or another expansion agent, a crosslinking agent, a catalyst, preferably a non-metallic catalyst, and optionally adjuvants such as plasticisers and pigments (see, for example, French Pat. Nos. 2,031,770 and 2,086,977, and J. of Cellular Plastics MAY/JUNE 1972, pages 134 to 143 W. Patten and D. C. Priest).

However it is essential that if these foams are to have a uniform and flexible skin and a regular cellular structure, particular low molecular weight organosilicon compounds should be used, and not simple diorganopolysiloxane oils, or diorganopolysiloxane and polyoxyalkylene block copolymers, usually employed for foams which require a heat after-treatment (see, for example, French Applications Nos. 2,200,313, 2,193,049 and 2,183,275). Unfortunately, these particular organosilicon compounds sometimes deleteriously affect the mechanical properties of the foams; this can be reduced by reducing the quantities used, but by so doing the stabilising effect and (cell) regularisation effect are then greatly reduced.

The object of the present invention is to overcome these disadvantages and to produce "cold" flexible polyurethane foams which have good mechanical properties and a regular cellular structure. According to this invention there is provided a process for the manufacture of a so-called "cold" flexible polyurethane foam which has good mechanical properties and, more especially, a high elasticity, which comprises pouring a foaming composition obtained by mixing, in the main, very active polyetherpolyols having an average of at least two hydroxyl groups per molecule, polyisocyanates, water, catalyst and crosslinking agent, into a mould exposed to the atmosphere, allowing the foam to form and releasing these from the mould, this process being characterised in that 0.05% to 3% by weight, relative to the polyether-polyol, of a triorganosilylated polyol of the general formula $(A)_a C(CH_2 OSiR_3)_{4-a}$, in which the symbols R, which may be identical or different, represent methyl, ethyl or vinyl radicals with the proviso that at least one radical R per $SiR_3$ group is a methyl radical, the symbol A represents a methyl or ethyl radical and the symbol a represents 0 or 1, is added to the foaming composition.

These triorganosilylated polyols can easily be manufactured by reaction of compounds of the formula $R_3SiX$ or $R_3SiNHSiR_3$ in which the symbol X represents a halogen atom, preferably chlorine, and the symbol R is as defined above with a polyol which is pentaerythritol, 1,1,1-(trimethylol)propane or 1,1,1-(trimethylol)-ethane.

The reactants, that is to say the compounds of the formulae $R_3SiX$ and/or $R_3SiNHSiR_3$ and the specified polyols, can be used in stoichiometric amounts. However it is advisable to provide a slight molar excess, generally 1 to 7%, of the compounds containing silicon, so as to complete the reaction more rapidly.

If the reactants containing silicon are the compounds of the formula $R_3SiX$ [see J. of Organometallic Chemistry, volume 20, pages 1750-1756 (1955) M. M. Sprung and L. S. Nelson], it is advisable to carry out the reaction in the presence of basic products which will form salts with the halogen-containing acids of formula XH generated. Examples of suitable basic products which may be mentioned are ammonia, pyridine, triethylamine, n-tributylamine and N,N-dimethylaniline.

The need for using these basic compounds can however be avoided by using equimolar mixtures of the compounds of the formula $R_3SiX$ and $R_3SiNHSiR_3$ as the organosilicon starting reactants. Thus, in order to prepare compounds corresponding to the formula $C(CH_2OSiR_3)_4$ it is possible to use such mixtures in which the molar amounts employed are calculated on the basis of the following equation:

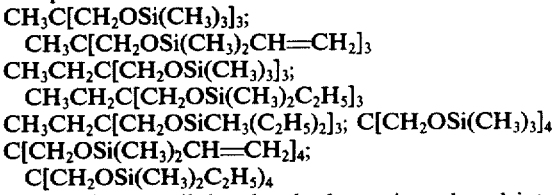

It is also advisable, for better control of the reaction temperature, and in particular in order to avoid abrupt rises in temperature, to carry out the reaction in an organic diluent such as toluene, xylene or cumene. The presence of these diluents also has the advantage that at the end of the reaction, when the acids XH have been converted to salts with ammonia or other basic compounds, they facilitate the removal, by filtration, of the salts dispersed in the reaction medium. The quantities of diluents employed are not critical; from 10 to 50% of the weight of the various reactants are generally suitable.

Specific triorganosilylated polyols which can be used in the process of this invention include the following:
$CH_3C[CH_2OSi(CH_3)_3]_3$;
$CH_3C[CH_2OSi(CH_3)_2CH=CH_2]_3$
$CH_3CH_2C[CH_2OSi(CH_3)_3]_3$;
$CH_3CH_2C[CH_2OSi(CH_3)_2C_2H_5]_3$
$CH_3CH_2C[CH_2OSiCH_3(C_2H_5)_2]_3$; $C[CH_2OSi(CH_3)_3]_4$
$C[CH_2OSi(CH_3)_2CH=CH_2]_4$;
$C[CH_2OSi(CH_3)_2C_2H_5]_4$ These triorganosilylated polyols are introduced into the foaming compositions in an amount of 0.05 to 3%, preferably 0.1 to 2%, by weight relative to the polyetherpolyols.

As already indicated, the foaming compositions are prepared principally by mixing polyther-polyols having an average of at least two hydroxyl groups per molecule, polyisocyanates, catalysts, crosslinking agents, water and/or other pore-forming agents.

The polyether-polyols employed should have a high reactivity which, to a large part, can be attributable to the value of the ratio of the number of primary hydroxyl groups to the number of secondary hydroxyl groups, this being generally at least 50/50 and at most 85/15. These polyols are in general prepared by polycondensing, with water or with a glycol or triol, or with a mixture of these compounds,
1. first, an alkylene oxide chosen from propylene oxide, butylene oxide and tetrahydrofurane, preferably propylene oxide, and
2. thereafter, ethylene oxide.

The organic polyisocyanates used industrially contain the isomeric diisocyanato-toluenes which are in the form of mixtures generally containing from 65 to 80% by weight of the 2,4-isomer and from 35 to 20% by weight of the 2,6-isomer, p,p'-diisocyanatodiphenylmethane and the polymethylene-polyphenyl-isocyanates. These three types of polyisocyanate can be used individually or as mixtures. The quantities employed are so calculated as to provide at least one NCO group per hydroxyl group of the polyetherpolyols; in this calculation, account is taken of the other reactive groups capable of reacting with the NCO groups and introduced, for example, as a result of the presence of water or of certain cross-linking agents.

The catalysts are preferably organic amines such as triethylenediamine, triethylamine, N,N,N', N'-tetramethyl-1,3-butanediamine, N,N-dimethylcyclohexylamine, N,N-dimethylethanolamine, N,N'-dimethylpiperazine and N-methylmorpholine. They are suitably used in an amount of 0.1% to 2% by weight, relative to the polyether-polyols.

The crosslinking agents are generally chosen from amongst 1,4-butanediol, 2,3-butanediol, triethanolamine, neopentyl glycol, trimethylolpropane, 3,3'-dichloro-4,4'-diamino-diphenylmethane and the triol of the formula $CH_3CH_2C(CH_2OCH_2CH_2OH)_3$. They are suitably used in an amount of 1% to 5% by weight, relative to the polyetherpolyols.

The foaming compositions most frequently contain, as expansion agent, water, generally in an amount of 1% to 6% by weight, relative to the polether-polyols. Other expansion agents such as volatile organic products, for example methylene chloride and monofluorotrichloromethane, can be employed, optionally mixed with water, generally in an amount up to 25% by weight of the polyether-polyols.

The foaming compositions can be obtained by simple mixing of the various ingredients previously mentioned, which can be introduced in any order. However, because of their high reactivity, it is preferable to introduce the polyisocyanates last; the mixtures which do not contain the polyisocyanates are stable and can thus be prepared beforehand and stored. It is advisable to stir the reaction mixtures vigorously during the addition of the polyisocyanates; the foaming compositions which result should be poured immediately into suitable moulds consisting, for example, of silicone rubbers or other materials, such as timber, aluminium and steel. The surfaces of these latter materials which come in contact with the foaming compositions can be coated with a non-stick agent based on silicone, for the purpose of facilitating release of the foams from the moulds. The moulds can be closed or open. They are closed for the preparation of moulded products which must have a well-defined shape and appearance, such as armrests of armchairs, and seats of cars. However, for the continuous preparation of bulky blocks of foam or of blocks of large surface area it is essential that the moulds should remain open; their upper part is thus not closed and the foams expand freely into ambient air. The blocks are then cut to the chosen sizes and used in, for example upholstery, furniture or wall coverings.

The foams prepared according to the process of this invention, in closed or open moulds, generally have a regular cellular structure without the presence, even near their surfaces, of large cells similar to the cells of "honeycombs"; furthermore, they are generally stable, that is to say they do not collapse during expansion, this collapse phenomenon being more common when foams are formed in open moulds. They also have the advantage that if the proportion of open cells which they contain is insufficient, they can be calendered subsequently and not only at the time that they leave the moulds. Finally, because of the nature and the proportions of the ingredients used to prepare the foaming compositions, they have good mechanical properties, especially a high elasticity.

The following Examples further illustrate the present invention.

EXAMPLE 1

The following ingredients are successively introduced into a 1.5 l. reactor equipped with a stirrer, after the stirrer has been started: 1,000 g. of a polyethertriol of molecular weight 5,000, in which about 75% of the hydroxyl groups are primary hydroxyl groups, and having a hydroxyl number of 35, 30 g. of water, 25 g. of 3,3'-dichloro-4,4'-diamino-diphenylmethane and 4 g. of triethylenediamine.

After the end of the addition, stirring is continued for 2 minutes. The base composition thus formed is stable and homogeneous.

158.85g of this base composition (containing 150 g. of the polyether-triol) are introduced into a 300 cm$^3$ reactor equipped with a variable-speed stirrer. The following are then introduced into this reactor:

1. 1.5 g. of tetrakis-(trimethylsiloxymethyl)-methane [prepared in accordance with the method described in J. of Organometallic Chemistry, volume 20, pages 1750–1756 (1955)], the contents of the reactor now being stirred for 20 seconds at a stirring speed of 1,000 revolutions per minute.

2. Thereafter, 54.1 g. of an 80:20 ortho/para mixture of toluylenediisocyanates, the resulting mixture being stirred for 5 seconds at 2,000 revolutions per minute.

The foaming composition obtained is immediately poured into a wooden mould having a 140 mm. square base and a height of 200 mm, which is without a cover and the inner walls of which are covered with a Kraft paper which has been rendered non-stick by means of silicone.

The foam (hereafter referred to as $F_1$) expands freely in the mould and rises above the open surface; no collapse relative to the maximum height reached is observed. The block of foam is released from the mould 2 minutes after the foaming composition has been cast and is then left for 24 hours at ambient temperature. At the end of this period of time, the block only shows slight shrinkage and its side walls in fact have little tendency to bend towards one another and depart from the vertical. The block is then cut, vertically, into two substantially equal parts. The cut surfaces show a regular cellular structure.

Separately, two foams $F_2$ and $F'$, similar to foam $F_1$, are prepared following the same procedure. However, the foaming composition which gives the foam $F_2$ only contains 0.6 g. of tetrakis-(trimethylsiloxymethyl)-methane (rather than 1.5 g.) per 150 g. of polyether-triol of molecular weight 5,000. The foaming composition which gives the foam $F'$ contains no tetrakis-(trimethylsiloxymethyl)-methane.

The foam $F_2$ has the characteristics of the foam $F_1$ but has a slightly less regular cellular structure; in contrast, the foam $F'$ has a markedly irregular structure, and "honeycomb" cells are present, principally at its base; furthermore, the foam collapsed by 30% (the collapse being measured relative to the maximum height reached) after its expansion in the mould.

Samples for the purpose of measuring the rebound and the so-called "sag factor" are cut, to the required sizes, from the foams $F_1$, $F_2$ and $F'$ which have beforehand been calendered manually.

The rebound measurements are carried out in accordance with Standard Specification ASTM D 1564 T; briefly, this consists of measuring the rebound of a steel ball of specified weight falling from a given height onto a sample of foam of size 100 × 100 × 50 mm. inclined at 45° to the axis of the fall. The results of the measurements can be expressed in % or in cm. The results in cm. give the distance between the point of impact of the ball on the foam sample and its point of return after rebounding from the sample. The higher the figures measuring the % or the distances in cm. are, the better are the elastic properties of the foam.

The "SAG FACTOR" represents the ratio of the thrust forces at 65% and 25% compression, the forces being exerted on a cubical sample of foam of 50 mm. side length and the rate of compression being 50 cm/min. The thrust corresponds to the force employed to achieve a given compression of the cubical sample, for example 25%, 50%, 65% or even more, and can be measured not only in compression but also in decompression.

The values of the rebound (expressed in cm) and of the "SAG FACTOR" of these foams are summarised in the Table which follows:

|  | $F_1$ | $F_2$ | $F'$ |
| --- | --- | --- | --- |
| Rebound | 49 | 49 | 49 |
| SAG FACTOR | 3.0 | 2.9 | 2.1 |

The figures summarised in this Table as well as the results given earlier relating to the behaviour of the foams during their expansion in the moulds, and to their physical appearance, show that the presence of a small amount of tetrakis-(trimethylsiloxymethyl)-methane in the compositions for producing foams of high elasticity is beneficial for these foams; thus, they do not collapse and have a regular structure throughout their mass, and furthermore their mechanical properties are preserved and even improved.

EXAMPLE 2

The following ingredients are successively introduced into a 1.5 l. reactor equipped with a stirrer, after the stirrer has been started: 1,000 g. of a polyethertriol of molecular weight 5,000, in which about 75% of the hydroxyl groups are primary hydroxyl groups, and having a hydroxyl number of 35, 30 g. of water, 10 g. of 3,3'-dichloro-4,4'-diamino-diphenylmethane and 4 g. of triethylenediamine.

After the end of the addition, the stirring is continued for 3 minutes. The foam composition obtained is stable and homogeneous.

156.6 g. of this base composition (containing 150 g. of the polyether-triol of molecular weight 5,000)are introduced into a 300 cm³ reactor equipped with a variable-speed stirrer. The following are then introduced into this reactor:

1. 1.5 g. of 1,1,1-tris-(trimethylsiloxymethyl)-propane [prepared as described in J. of Organometallic Chemistry, volume 20, pages 1750–1756 (1955)], the contents of the reactor then being stirred for 20 seconds at 1,000 revolutions per minute.

2. 52.3 g. of 80-20 ortho/para mixture of toluylene-diisocyanates, the resulting mixture being stirred for 20 seconds at 2,000 revolutions per minute.

The foaming composition obtained is immediately poured into the wooden mould without cover described in Example 1.

The foam expands freely and rises above the open surface of the mould. A slight collapse (4%) relative to the maximum height reached is observed. The block of foam is removed from the mould 2 minutes after casting and is then left for 24 hours at ambient temperature. After being left for this period, it shows no shrinkage and its side walls are in effect substantially vertical.

The block is then cut, in the height direction, into two substantially equal parts; the cut surfaces show a fine and regular cellular structure.

By way of comparison, a foam similar to the above is prepared following the same procedure except that the foaming composition does not contain any 1,1,1-tris-(trimethyl-siloxymethyl)-propane. In the case of this foam, a collapse of 35% relative to the maximum height reached in the mould is observed; on its cut surfaces, the foam exhibits an irregular cellular structure; in particular, large cells of the "honeycomb" type can be seen towards its base.

EXAMPLE 3

The following ingredients are succesively introduced into a 1.5 l. reactor equipped with a stirrer, after the stirrer has been started: 1,000 g. of a mixture consisting of 910 g. of a polyether-triol of molecular weight 4,800 and 90 g. of a polyether-glycol of molecular weight 800 (the preparation of these two polyethers being as described in Examples 1 to 4 of French Pat. No. 2,086,977), 30 g. of water, 8 g. of N,N-dimethylcyclohexylamine, 8 g. of a 33% solution of triethylenediamine in dipropylene glycol, 100 g. of fluorotrichloromethane and 1 g. of the tetrakis-(trimethyl-siloxymethyl)-methane used in Example 1.

After the end of the addition, the stirring is continued for 5 minutes. The composition obtained is stable and homogeneous. 145 g. of this composition are placed in a 300 cm³ reactor equipped with a variable-speed stirrer. 60 g. of a mixture consisting of 42 g. of p,p'-diisocyanatodiphenylmethane and 18 g. of 80-20 ortho/para mixture of toluylenediisocyanates are added to the contents of this reactor and the whole is then stirred for 20 seconds at 2,000 revolutions per minute.

The foaming composition resulting therefrom is immediately poured into a metal mould having a square base (200 mm.) with a height of 100 mm, and equipped with a cover. The cover is closed; it is then opened 10 minutes after the foaming composition has been cast, and the foam obtained is immediately released from the mould. The block of foam is left exposed to the atmosphere for 35 minutes and is then calendered manually. It has a thin, homogeneous, porous surface skin of pleasant appearance; furthermore its dimensions are virtually those of the mould in which it has been formed and it thus does not show any apparent shrinkage.

By way of comparison, a foam is prepared in accordance with the same process except that the foaming composition does not contain any tetrakis-(trimethylsiloxymethyl)-methane. The block of foam thus obtained has a heterogeneous, thick surface skin of rough appearance; furthermore, the block exhibits a large amount of shrinkage and, in particular, its side walls are markedly concave.

We claim:

1. In a process for the manufacture of a "cold" flexible polyurethane foam which comprises pouring a foaming composition comprising a foam-forming polyether-polyol having an average of at least two hydroxyl groups per molecule, and a polyisocyanate into a mould allowing the foam to form and releasing the foam from the mould the improvement wherein the composition contains about 0.05% to 3% by weight, based on the weight of the polyether-polyol, of a triorganosilylated polyol of the general formula $(A)_aC(CH_2OSiR_3)_{4-a}$, in which the symbols R, which may be identical or different, represent methyl, ethyl or vinyl radicals with the proviso that at least one radical R per $SiR_3$ group is a methyl radical, the symbol A represents a methyl or ethyl radical and the symbol a represents 0 or 1.

2. Process according to claim 1, in which the triorganosilylated polyol has the formula $$CH_3CH_2C[CH_2OSi(CH_3)_3]_3$$

or $$C[CH_2OSi(CH_3)_3]_4.$$

3. Process according to claim 1 in which the triorganosilylated polyol is present in an amount from 0.1 to 2% by weight based on the weight of the polyether-polyol.

4. Process according to claim 1 in which the polyether-polyol is one in which the ratio of the number of primary hydroxyl groups to the number of secondary hydroxyl groups is at least 50/50 and at most 85/15.

5. Process according to claim 1 in which the polyisocyanate is an isomeric mixture of diisocyanatotoluenes containing 65 to 80% by weight of 2,4-isomer and 35 to 20% by weight of 2,6-isomer, p,p'-diisocyanato-diphenylenemethane or a polymethylene-polyphenyl-isocyanate.

6. Process according to claim 1 in which the composition contains an organic amine, as catalyst, water, as expansion agent, and a polyol selected from 1,4-butanediol, 2,3-butanediol, triethanolamine, neopentyl glycol, trimethylolpropane, 3,3'-dichloro-4,4'-diaminodiphenylmethane and the triol of formula: $CH_3CH_2C(CH_2OCH_2CH_2OH)_3$, as crosslinking agent.

* * * * *